Sept. 9, 1958 F. H. BRAY ET AL 2,851,534
AUTOMATIC TELECOMMUNICATION EXCHANGE SYSTEM
Filed March 18, 1952

INVENTOR
F. H. BRAY
M.A.E. BUTLER
BY
ATTORNEY

INVENTOR
F. H. BRAY
M.A.E. BUTLER
BY
ATTORNEY

Sept. 9, 1958

F. H. BRAY ET AL 2,851,534

AUTOMATIC TELECOMMUNICATION EXCHANGE SYSTEM

Filed March 18, 1952

INVENTOR
F. H. BRAY-
M.A.E. BUTLER
BY
ATTORNEY

Sept. 9, 1958   F. H. BRAY ET AL   2,851,534
AUTOMATIC TELECOMMUNICATION EXCHANGE SYSTEM
Filed March 18, 1952   15 Sheets-Sheet 15

| FIG. 2 | FIG. 3 | FIG. 4 | FIG. 5 | FIG. 6 | FIG. 7 |
|---|---|---|---|---|---|
| FIG. 9 | FIG. 10 | FIG. 11 | FIG. 12 | FIG. 13 | FIG. 14 |

INVENTOR
F. H. BRAY
M. A. E. BUTLER
BY
*Robert Harding Jr.*
ATTORNEY

United States Patent Office 2,851,534
Patented Sept. 9, 1958

2,851,534

AUTOMATIC TELECOMMUNICATION EXCHANGE SYSTEM

Frederick Harry Bray and Michael Arthur Edgeworth Butler, London, England, assignors to International Standard Electric Corporation, New York, N. Y.

Application March 18, 1952, Serial No. 277,192

Claims priority, application Great Britain April 6, 1951

14 Claims. (Cl. 179—18)

This invention relates to automatic telecommunication exchange systems of the type employing a plurality of registers and a common translator, and to common translators for use in such systems.

One feature of the present invention comprises an automatic telecommunication exchange system comprising a group of register-controllers and a register-translator associated in common with said register-controllers and electronic means for inter-connecting said register-translator and any one of said register controllers.

A further feature of the present invention comprises an automatic telecommunication exchange system comprising a plurality of registers and a common translator, comprising electronic means for scanning said registers in search of a register requiring the services of a translator, and electronic means responsive to detection of such a register to stop said scanning and to interconnect the translator and that register.

A further feature of the present invention comprises an automatic telecommunication exchange system having a plurality of registers and a common translator, and electronic means in said translator for scanning said registers in search of a register requiring its services, and electronic means in said translator responsive to detection of such a register to stop said scannnig and to interconnect the translator and that register.

A further feature of the present invention comprises an automatic telecommunication exchange system having a plurality of registers and a common translator, and means for interconnecting the translator and one of said registers in response to reception by that register of the called exchange designation digits, means in the register for requesting the translation digits from the translator singly, and means in the translator for sending the translation digits separately to the register under control of said digit requesting means.

A further feature of the present invention comprises a common translator for use in an automatic telecommunication exchange system employing a plurality of registers, which comprises register scanning means to search for a register requiring a translation and means responsive to detection of such a register to stop the scanning and to interconnect that register and the translator.

The invention will now be described with reference to the accompanying drawings, in which.

Figure 1:
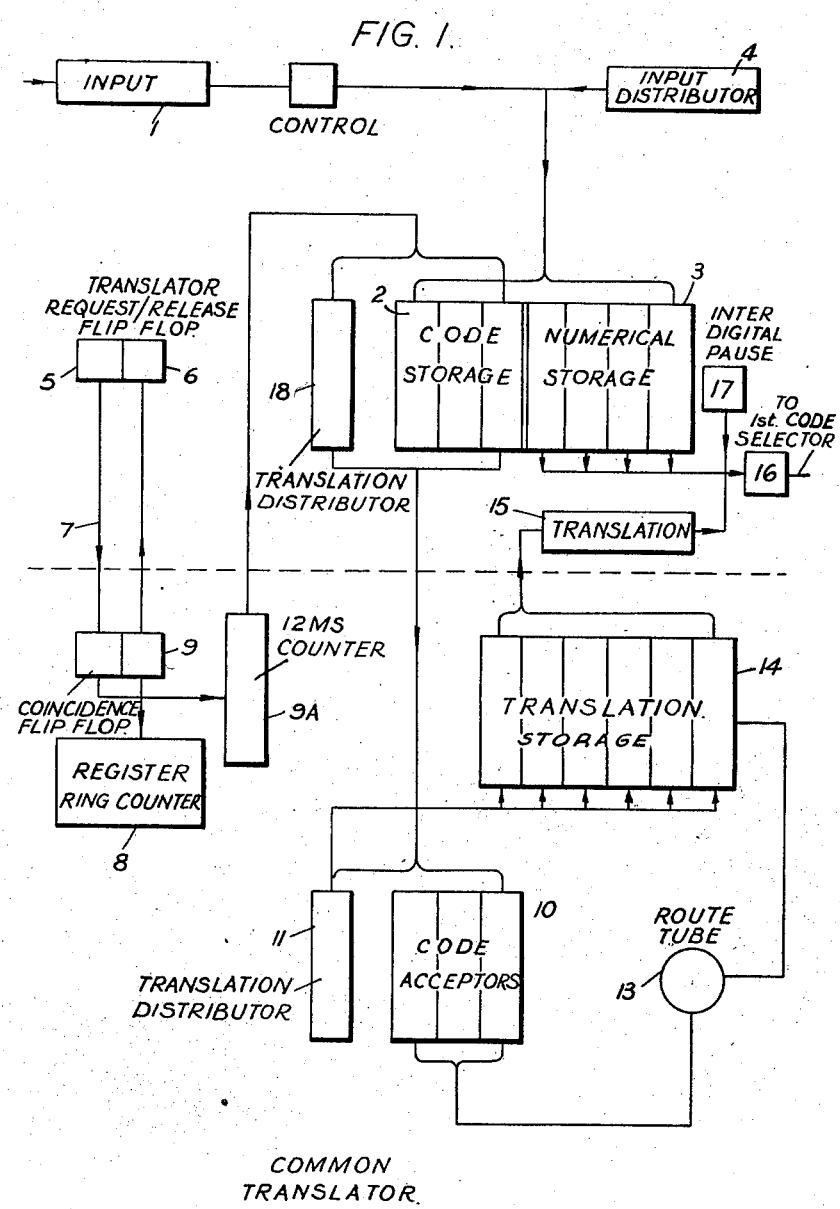
Fig. 1 is a block schematic of a register and a common translator according to the present invention.

The principles of operation of the circuit will first be described with reference to Fig. 1. It is assumed that the numbers dialled by subscribers will have three exchange designation digits followed by four numerical digits (e. g. HOLborn 8765, i. e. 405–8765), and that the exchange designations sent out by the register will comprise up to six digits.

The input to a register is received in the present embodiment at 10 impulses per second on an input circuit 1. This is a multi-cathode gaseous tube on which each digit is temporarily stored on receipt. When a digit has been received, the input multi-cathode tube 1 is driven to its home cathode by 1000 cycles per second pulses, which pulses also drive the first tube of the code storage circuit 2. When tube 1 reaches its last position, the supply of pulses is cut off, so that the first tube of the code storage circuit is left standing on the cathode corresponding to the complement of the received digit. This process is repeated until the complements of all three code digits are stored in the code storage circuit 2 and the complements of the numerical code digits are stored in the numerical storage circuit 3. The input distributor 4 ensures that each received digit is sent to the correct part of the storage circuits.

When all three code digits have been received, the request tube 5 of the request/release flip-flop 5—6 is fired. This applies a condition to the request lead 7 extending to a common translator, which condition indicates that a translation is required by that particular register.

Within the translator there is a register ring counter 8 having a position corresponding to each and every register which the translator serves. This counter continually hunts over these positions at 1000 cycles per second i. e. at 1000 positions per second, searching for a calling register. When there is the coincidence of ring counter 8 standing in the position corresponding to a particular register and the request tube 5 of that register fired, the coincidence flip-flop 9 is fired. This stops the counter 8 and allows a 12 millisecond pulse to pass into the calling register. This 12 millisecond pulse is obtained by allowing a 12 point multi-cathode tube 9A to step through a complete operational cycle under the control of the source of 1000 cycles per second pulses.

In the calling register this 12 millisecond pulse allows each code storage tube to step through a complete cycle, finally stopping in the position from which it started, which is, of course, that for the complement of the received digit. When each code storage tube performs its complete cycle, it applies a marking condition to the corresponding tube of the translation circuit code acceptor 10 which started to drive at the same time as the corresponding register tube. This condition is generated when the discharge in the register code storage tube reaches the final cathode in its tube. As this is a "complement of the complement" of the code digit, the code acceptors 10 receive the actual code digits. During this setting up process the translation distributor 11 will have been set to a position corresponding to the translation digit required, in this case the first digit.

Therefore there is set up in the translator code acceptors 10 and translation distributor 11 conditions which tell the translator what code was dialled and which digit (in this case the first) of the translation is required. At the end of the 12 millisecond pulse, a route tube corresponding to the required exchange is fired. There is one route tube in the translator for every exchange in the system, only one tube 13 being shown. This tube is fired on the coincidence of one particular cathode from each code acceptor.

When the selected route tube fires, it sets up in the translation storage circuit 14 the complete translation corresponding to the route tube which is firing. The digit required by the register is now sent under control of the translation distributor 11 from the translation storage circuit 14 to the translation circuit 15 in the register. The combination set up in the translation circuit 15 is the complement of the actual translation digit, so that by driving home the storage multi-cathode tube in the translation circuit 14 which corresponds to the required digit it will be possible to send to the subsequent equipment a "complement of a complement."

When the appropriate tube of the translation tube reaches home, it causes the register to be released and the ring counter 8 to restart. The translation digit is then pulsed out by 16 under control of the inter-digital pause circuit 17 at 10 impulses per second.

The translation distributor 18 in the register now assumes a position corresponding to the next required (in this case second) translation digit, and the process is repeated when the ring counter re-examines the register. This continues until the whole translation has been sent, when the numerical storage tubes are driven home in turn to send out the digits.

Means is provided to indicate to the register that the translation is complete, to cater for "0" level calls, dead codes, etc. All these facilities will be described in the full description.

Figures 15, 16:
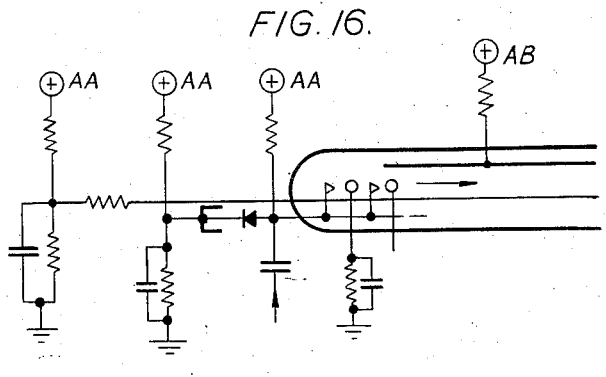
Fig. 15 is a diagram indicating how Figs. 2 to 7 and 9 to 14 should be arranged to obtain the complete circuit.
Fig. 16 is a typical multi-cathode tube circuit.

The circuits described use multi-cathode tubes of the type disclosed in the United States patent to Hough, No. 2,553,585. The tubes used in the present circuit have twelve cathodes: a home cathode, ten cathodes for 1–0 and a final cathode whose purpose will be described hereinafter. A typical circuit of such a tube is shown in Fig. 16. In the other figures showing these tubes the screen electrode and its connections are omitted and only one transfer cathode is shown. The biassing circuit for the transfer cathodes is shown in the other circuits as an arrow whose head is marked "Bias."

Figure 8:
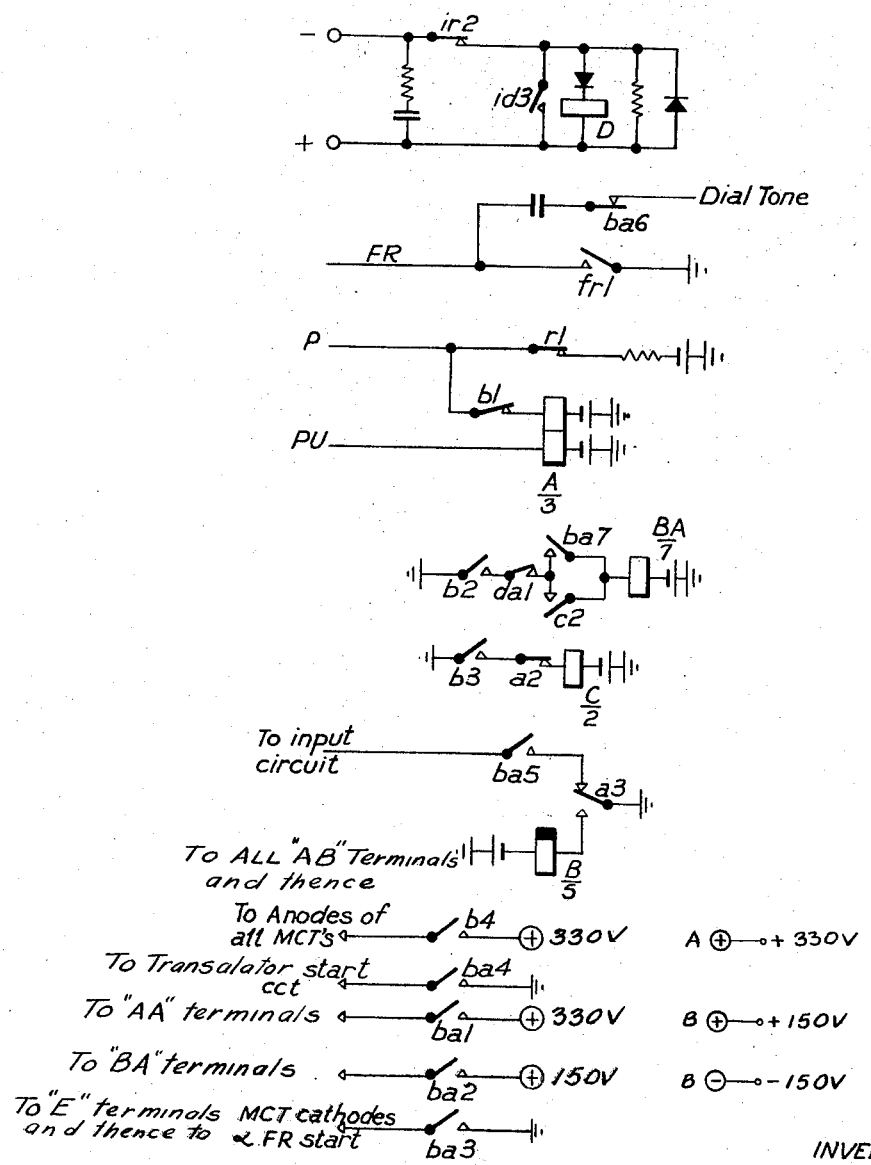
Fig. 8 shows certain relay circuits appertaining to Figs. 2 to 7.

In all the figures, connections to positive designated A are 330 volts supply, AA connections being switched on by a relay BA (Fig. 8), and AB connections being switched on by a relay B. Connections marked B whether positive or negative are to 150 volt sources, and a connection marked BA is a 150 volt source controlled by relay BA. Connections marked E in a ring go to earth over front contacts of relay BA.

Connection to the cathodes of MCT6–9 (Fig. 5) are marked "to 0 level Terminal Block." From this they are taken to earth over contacts of relay BA. The purpose of this will be described under the heading "0 Level Calls."

*The register (Figs. 2–7 and Fig. 8)*

The A relay (Fig. 8) is seized in the usual manner over the P lead and, in operating, it operates relay B. At $b4$ this connects high tension (330 v.) to the anodes of all the multi-cathode tubes, which thereupon fire on their home cathodes, these being the only cathodes now connected to earth. Pulsing-in to the equipment then occurs over lead PU, causing A to make and break its circuit. On its first break, relay C operates over $a2$ and $b3$ to operate relay BA over $b2$, $da1$ and $c2$. BA locks over $ba7$ and connects all unconnected high tension supplies, connects earth to all points marked (E) and starts the translator circuit.

When relay BA operates, as described above, relay A having already released, tube T9 (Fig. 2) fires. The contact $a1$ of relay A now being closed, the connection to 150 volts negative in the trigger circuit of the tube is earthed. When T9 fires, its cathode output is applied to the trigger electrode of tube T8, and with the differentiated trailing edge of a 1000 cycles per second 30 microseconds, pulse fires T8, which extinguishes T9 in the usual manner. The cathode output of T8, which is a positive pulse, is applied over a rectifier to the trigger of the gate tube G1, which fires on the next 1000 cycle per second negative pulse on its cathode. When G1 fires, its negative-going anode output is applied over a condenser to the transfer electrodes of tube MCT1, which therefore steps from its home cathode to its second cathode. The anode output of G1 also extinguishes T8, so that T8—T9 are now ready for the next impulse. The purpose of T8—T9 is to prevent pulse clipping due to gate G1 being opened in the middle of a 1000 cycles per second pulse, as could happen otherwise.

Subsequent impulses are effective on T9 by the break of $a1$ when relay A releases at the beginning of the impulse. The dialled impulses are therefore passed to MCT1, the input multi-cathode tube, via T9—T8—G1 until the last one is received, when MCT1 is left standing on a cathode corresponding to the numerical value of the digit received. Thus for H, which is 4 impulses, the tube will have stepped four times to rest on its fifth cathode.

Figure 2:
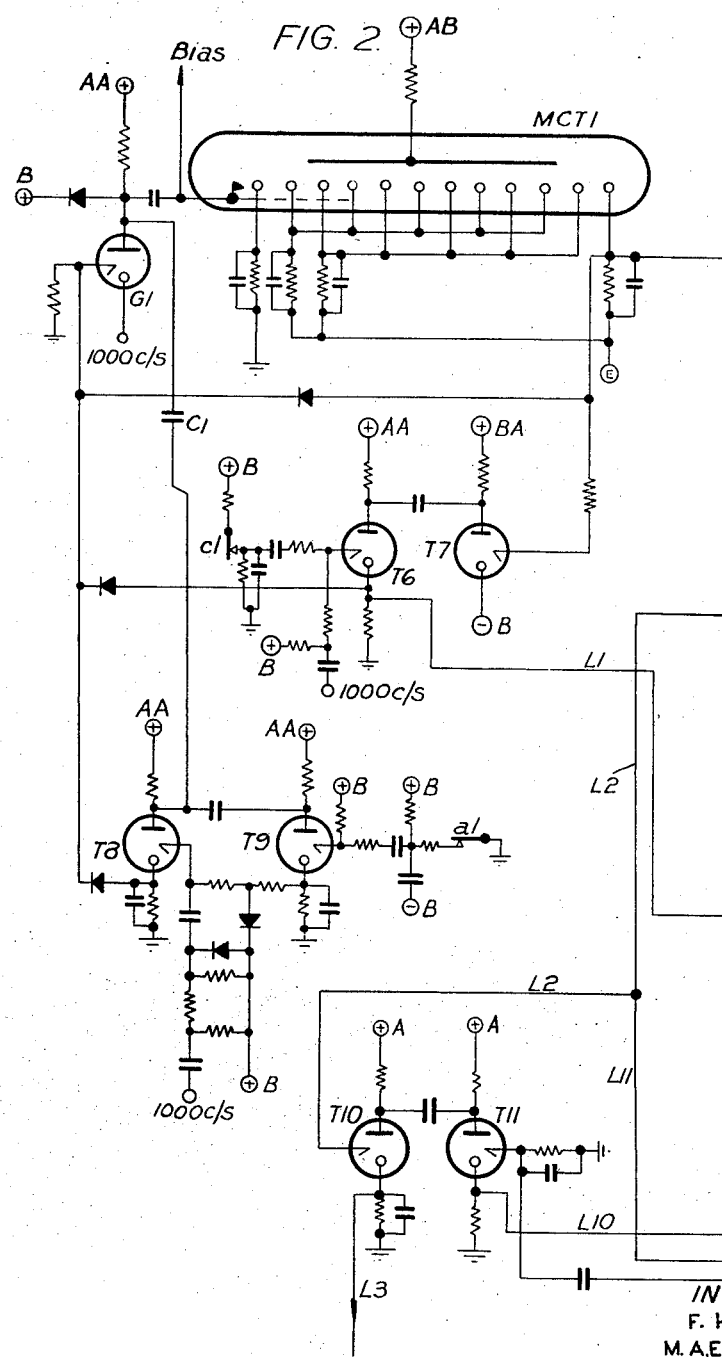
Figs. 2 to 7 is a complete circuit of a register according to the present invention.

At the end of the digit, relay C (Fig. 8) releases in the usual manner, and closes its contact $c1$ (Fig. 2). This applies a positive potential to T6 (of the input transfer flip flop T6—T7), which therefore fires on the next 1000 cycles per second pulse. When T6 fires the positive-going cathode output thereof is applied over a rectifier to the gate G1, which is therefore permitted to fire on succeeding 1000 cycles per second. These pulses cause MCT1 to step to its twelfth cathode, whereat tube T7 fires therefrom and extinguishes T6. This will have required 7 pulses, the complement to eleven of the received digit. MCT1 then steps to its first cathode since G1 is opened to one more pulse from the twelfth cathode.

Figure 4:
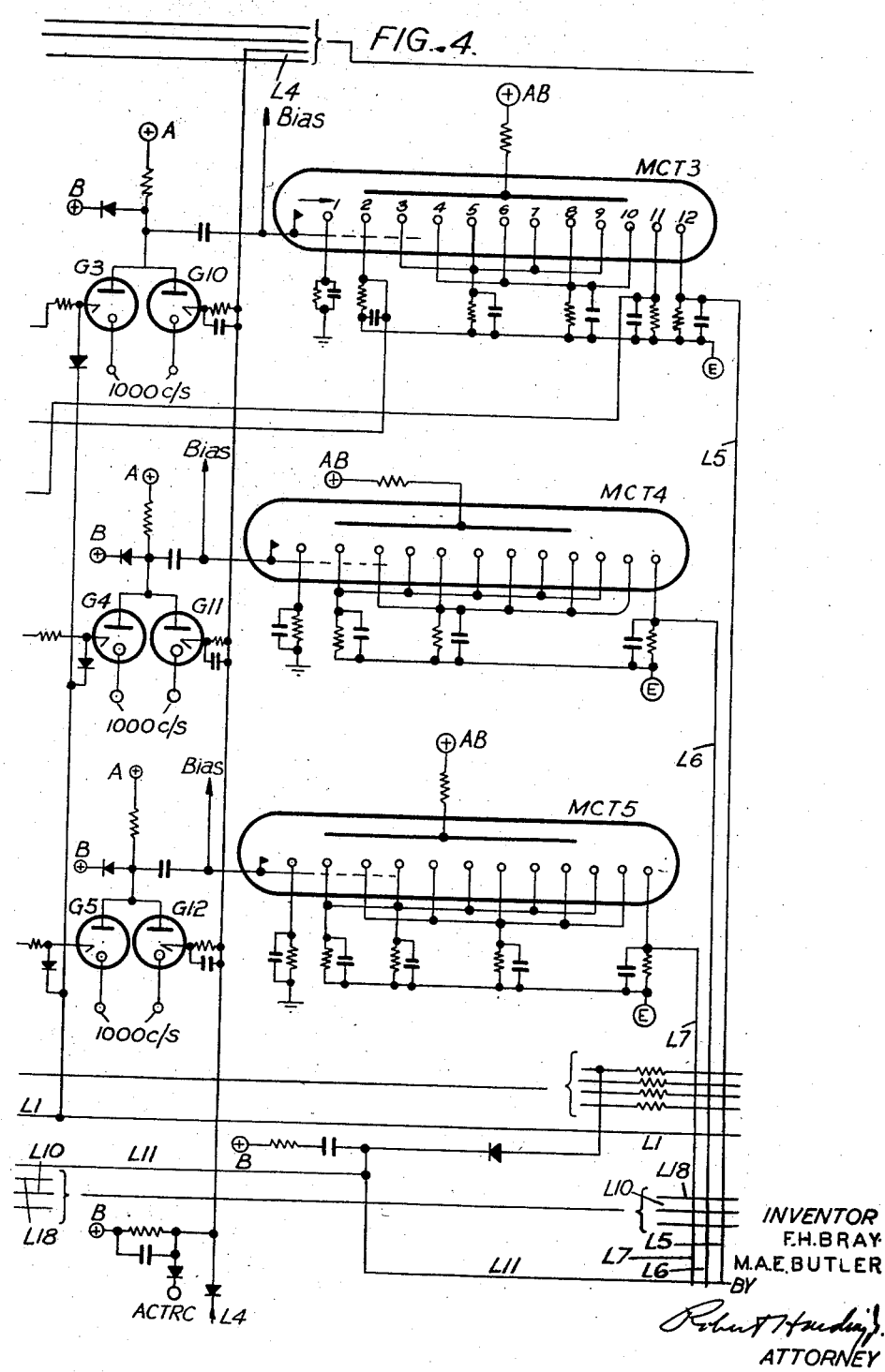
Figure 5:
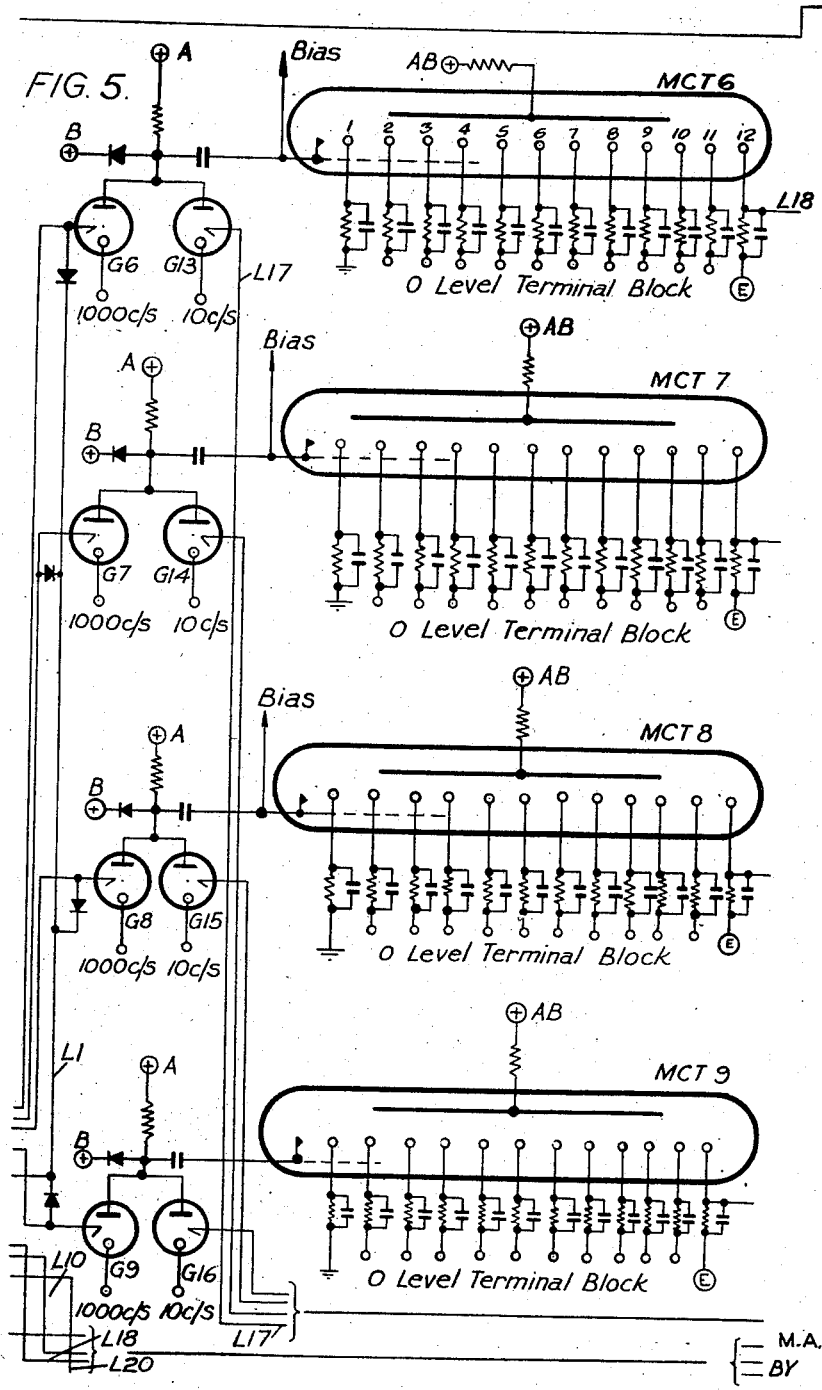

When T6 fired its cathode output was also fed over lead L1 to the trigger circuits of gate tubes G3–G9 (Figs. 4 and 5). These are the input gates for the code storage tubes MCT3, MCT4 and MCT5 and for the numerical storage tubes MCT6–MCT9. These input gates are also controlled from the input distributor MCT2, according to the digit being received. Thus for the first digit, the A code digit, MCT2 is discharging at its first cathode, with the positive potential applied therefrom to gate tube G3. Therefore when T6 is fired, the coincidence thereof with the operation of MCT2 over its first cathode opens the gate G3 to 1000 cycles per second pulses until T6 extinguishes and closes the gate G3. This occurs when MCT1 reaches its twelfth cathode, i. e. when G3 has been opened for long enough in the example mentioned for seven pulses, the complement to eleven of the digit four, to have been applied to MCT3, which is therefore left with the discharge on its eighth cathode. Thus the complement of the first dialled digit has been stored in MCT3.

When MCT1 reached its twelfth cathode, in addition to firing T7 and its own gate tube G1, it also opened the gate G2 for MCT2. Therefore the next 1000 c./s. pulse also fired G2 and stepped MCT2 once to its second cathode. In this position it primes the gate G4 for MCT4.

The second digit is received in the same manner in MCT1 via T9—T8—G1, and between dialled digits its complement is stored in MCT4, the second code storage tube, in the same manner as the complement of the first digit was stored in MCT3. When MCT1 passes through its twelfth position it again steps MCT2 via G2, so that G5 is now primed.

In the same manner all the digits are received and their complements stored in the storage tubes. When MCT2 steps on to its sixth cathode, tube T3 is fired, which indicates, as will be described, that the second numerical digit has been received. Similarly, when MCT2 steps to its seventh cathode T4 is fired to indicate that the third numerical digit has been received. The fact that the fourth numerical digit has been received is indicated by the presence of the discharge in MCT2 on its eighth cathode.

When the input distributor MCT2 steps to its fourth cathode, indicating that all three code digits have been received, a positive potential is applied therefrom over lead L2 to the trigger of the translator request tube T10, which therefore fires. The positive output from the cathode of this tube goes via a lead L3, individual to each register, to the common translator.

As the translator is fully described later in the specification its functions and operations will only be mentioned here to the extent necessary to understand the operation of the register.

Figure 6:
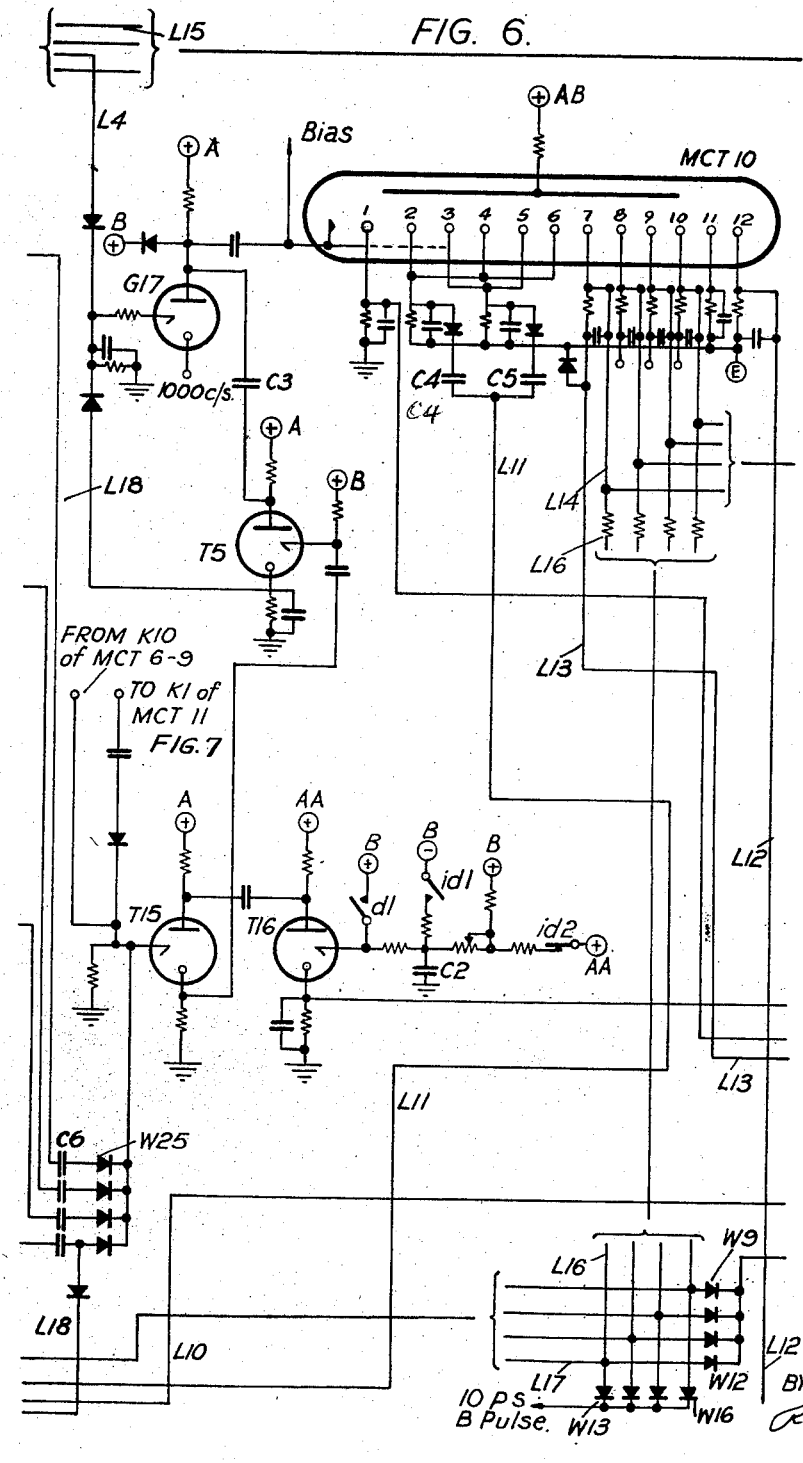

The translator contains a ring counter having a position corresponding to every register, and all the positions are scanned to see if any register requires the translator. When the ring counter finds a "calling" register it stops its scanning and sends back to all the registers a 12 millisecond impulse over lead L4 (Fig. 4), there being one of these leads for each register. This pulse is simultaneously applied to gates G10–G12 and G17. G10–G12 are "output" gates for tubes MCT3–5 and G17 is the gate for the translation distributor MCT10 (Fig. 6).

The translation is sent to the register digit by digit, the register requesting each digit separately. The translation contains up to six digits, so the first six positions of the translation distributor are for these six digits, the remaining positions being for the four numerical digits and being used to control the translator, as will be described.

The coincidence of the 12 millisecond pulse received on L4 (Fig. 4) and of a positive potential from the ring counter position corresponding to this register on terminal ACTRC (allotted cathode of translator ring counter) opens the gates G10–G12 and G17 for 12 milliseconds. Therefore these four tubes are driven through one complete cycle of twelve pulses. Thus the storage tubes, after this, still retain the complements of the ABC digits. The discharge in these tubes reaches the twelfth cathodes at a time relative to the start of stepping dependent on the complement of the digital value stored therein. Thus in our example, when H was the A digit, MCT3 is discharging at its eighth cathode, having been stepped seven times. To reach its last cathode it must be stepped four times.

When each of the tubes reaches its last cathode an output positive pulse is sent to the translator. These output pulses are sent over leads L5–7 respectively for MCT3–5 and L12 for MCT10. These are leads L5–7 and L12 from each register, and leads L5–7 are multipled at the triggers of tubes T58, T60, and T62, respectively, while leads L12 are multipled at the trigger of tube T70. In the case of the storage tubes the position in time of the twelfth cathode output pulse with respect to the commencement of the 12 millisecond pulse from the translator indicates to the translator the value of the digit. As this indicates the complement of what is held in the tube the actual value of the digit is indicated to the translator.

In the translator there is a translation distributor which starts operation when the 12 millisecond impulse commences. This steps in synchronism with MCT10, and when MCT10 reaches its twelfth cathode the output therefrom stops the distributor in the translator. MCT10, however, steps on to finish its cycle. Therefore the translator also receives a signal telling it which digit of the translation is required.

The translator therefore has all the information necessary for it to pass back to all the registers the digit of the translation required, in this case the first digit. The digit is received over L8 (Fig. 7), there being one of these leads for each register as a positive direct current pulse whose duration corresponds to the complement of the value of the translation digit. This pulse, together with the presence on ACTRC (the allotted cathode of the translator ring counter) of a positive potential from the ring counter opens the gate G18 of that particular register long enough to step MCT11, the translation tube, to a position corresponding to the value of the digit. This is done, as usual at 1000 cycles per second. Thus we now have MCT11 set to the complement of the value of the first translation digit. It will be apparent that this part of the operation will in general be simultaneous with the storage in MCT–9 of some or all of the numerical digits of the called number.

The translator then applies a positive potential to all of the leads L9 (Fig. 3) leading to the different registers, which together with the positive potential applied from the particular cathode of the ring counter to ACTRC, fires the release tube T11 (Fig. 2). This extinguishes the request tube T10.

At this time, since relay D (Fig. 8) is normally operated with its contact d1 applying positive bias to the trigger of T16 (Fig. 6) and ID (Fig. 7) is normally inoperative with id1 open and id2 closed, tube T16 of the inter-digital pause (IDP) flip flop T15—T16 is discharging. Hence we now have T11 and T16 simultaneously discharging. Therefore the rectifier W1 connected to the trigger of T18 (Fig. 7) is blocked over lead L10 by the positive cathode potential of T11 (Fig. 2). W2 is blocked by the positive cathode potential of T16. Since MCT11 is now set to store the first digit of the translation of the called exchange code it is discharging at one of its cathodes 3 to 12. Therefore either W3 or W4 will be blocked from one of the cathodes of MCT11, and therefore positive potential is applied to the trigger of T18 over W5 or W6. Thus we now have the condition of W1 and W2 blocked from T11 and T15, and W3 or W4 blocked from MCT11. T18 is impulse-controlled, its anode supply being a 10 impulses per second supply, at 150 volts and with a 70% make period, and its grid supply being a 1 millisecond 10 impulse per second impulse which coincides with the beginning of the anode impulse. These impulse sources are designated X and Y respectively. With the coincidence described, on the next X and Y pulses T18 fires and the sensitive relay IR operates.

Figure 7:
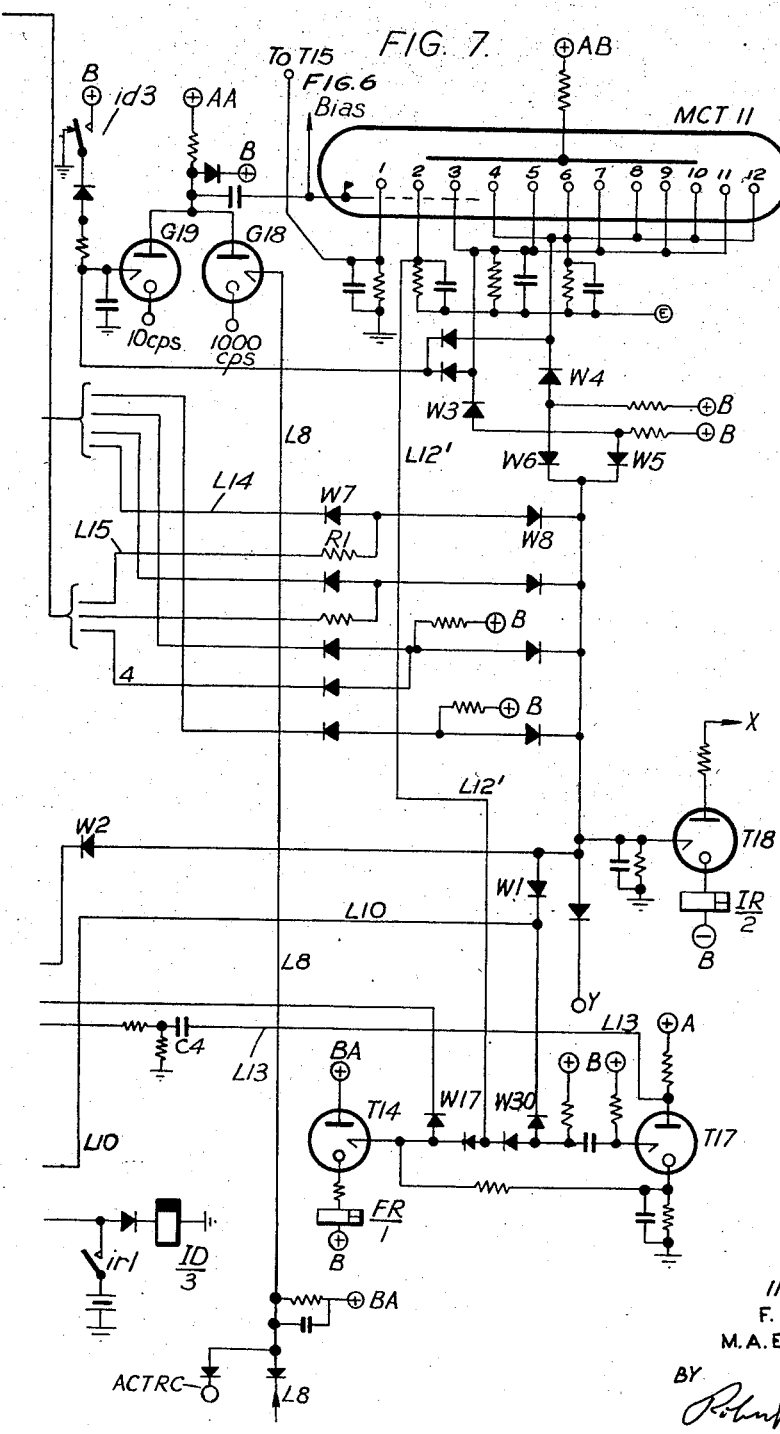

At its front contact ir1, IR operates the slow to release relay ID (Fig. 7). This relay closes id1 and opens id2 in the trigger circuit of T16, but this has no immediate effect on the circuit action as T16 is discharging. At contact id3 positive potential is applied to the trigger electrode of gate tube G19. Therefore G19 fires, and hence MCT11 steps once on each 10 per second impulse thereafter. Thus we have MCT11 stepping on the 10 per second impulses and T18 firing and operating IR in synchronism therewith. ID, of course, holds throughout the impulse train as it is slow to release. For the same reason, G19 does not fire again pending the release of slow-release relay ID.

The 10 per second impulse which causes MCT11 to make its final step, from its twelfth cathode to its home position, also operates IR for the last time. When MCT11 fires on its first cathode the output therefrom fires T15 of the IDP flip-flop, which extinguishes T16. T16 cannot fire again until C2 has charged positive again after relay ID releases. This fixes the duration of the inter-digital pause. Since the discharge in MCT11 is at its first cathode, W3 and W4 are unblocked, so T18 cannot re-fire until after MCT11 receives another translation digit.

The direct current pulse from the translator has been described as having a length determined by its complement. This is the complement of the digit to twelve. Thus if the digit is 0, the translation tube MCT11 is stepped twice, to its third cathode. When the translation is sent to the line, tube MCT11 is stepped ten times to bring it to its home cathode. In the example described, HOL it is assmued that the translation is 8792, in which case the complement to 12 of the first is 4, so that MCT11 is stepped to its fifth cathode. When it is stepped home, controlling the impulsing out, it steps eight times to reach home, so that IR is operated eight times.

When T15 of the inter-digital flip-flop fired from the home cathode of MCT11, its cathode output fired the translation distributor control tube T5. The cathode output of T5 was applied to the trigger of G17, which therefore fires on the next 1000 c./s. impulse. The negative-going anode output of G17 steps MCT10 in the usual manner, and via C3 extinguishes T5 so that MCT10 only steps once, to reach its second position. Via C3 and L11 and L2 the positive-going output of this cathode fires the request tube T10 (Fig. 2). Thus the register is once again requesting the use of the translator.

It will be remembered that the translation distributor MCT10 was driven through a complete cycle when the register was seized over L4, and that the translator contains a translation distributor which stepped in synchronism with MCT10. This distributor was stopped by the twelfth cathode output from MCT10 over L12. This it was that told the translator to send the first digit (8).

In due course the ring counter finds L3 marked as before, and once again seizes the register by applying the 12 millisecond pulse to L4. As in the previous case, the 1000 cycle per second pulse drives MCT3–5 and MCT10 through one complete cycle, and as before the outputs from the twelfth cathodes of these tubes are sent to the translator over leads L5–L7 and L12. However, MCT10 is now initially on its second cathode, so its twelfth cathode output pulse occurs after 10 steps whereas previously it occurred after 11 steps. Hence the distributor in the translator is stopped after its tenth step and not after its eleventh step. This tells the translator that the second digit of the translation is required. When the third translation digit is required, the request tube T10 is fired over L11 and L2 from the third cathode of MCT10, via C5. It will be seen that when second, fourth and sixth digits are required T10 fires via C3, and when the third and fifth digits are needed, T10 fires via C5.

The second translation digit is received from the translator as before in the form of its complement to twelve, and the correct digit then sent to the line. MCT10 steps to its third cathode and once again the register requests the translator. This action continues until all the translation digits have been received by the register and sent out.

*Digit cut off.*—Since the translation might involve less than six digits (in the example quoted it had four digits) it is necessary to give the register a digit cut off condition after the last translation digit. To do this, after the last digit (if there are less than six digits) the register marks L3 in the usual manner, and the translator seizes the register in the usual manner. However, the translation sent over L8 is that pertaining to the digit cut off condition. It will be remembered that for translations which are sent to the line there was never one which involved leaving MCT11 discharging at its second cathode, i. e. after one step. Therefore the pulse representing the translation is, for digit cut-off, of such a length that MCT11 steps once, and once only.

The output from the second cathode of MCT11 fires the digit cut off tube T17. T17 fires because the translator, having sent this translation, will have caused T11 (Fig. 2) to fire, so that W30 is blocked therefrom over L10. The negative-going output is applied over L13 and C4 to the seventh cathode of MCT10, so that the discharge therein shifts to this position. In this position MCT10 is ready to control the transmission to the line of the numerical digits. This will be fully described later.

If the translation is a six digit combination, MCT10 will already have stepped to its seventh cathode, so that tube T11 does not fire again in this case. The translator is not therefore required to send a digit cut off. The equipment then proceeds as will be described to attend to the numerical digits.

Sending numerical digits to line

It will be remembered that the tubes MCT6–9 hold the complements of the numerical digits of the called number.

When the discharge in the distributor MCT10 is at its seventh cathode, indicating that translation is complete, this tube acts as numerical digit distributor for the next four positions. A positive potential from the seventh cathode of MCT10 blocks W7 over L14, and W1 is blocked from T11 and W2 is blocked from T16. Therefore a positive potential applied to the trigger of T18 from the cathode of T3 (Fig. 3) over lead L15, resistance R1 (Fig. 7) and rectifier W8 causes T18 to fire on each successive 10 per second impulse. As has already been stated, T3 discharging proves that the second numerical digit has been received.

When T18 fires, relay IR operates as usual, and operates relay ID at *ir*1. This contact also applies a positive potential from battery to the rectifiers W9–W12, this application of positive potential lasting throughout the 10 per second, 70% pulse. On the 10 per second B pulse, which is a 1 millisecond pulse coincident with the trailing end of the 70% pulse, a positive potential is also applied to rectifiers W13–W16. As a result of the coincidence of these positive potentials applied to W9–W16 and of a positive potential on the seventh cathode of MCT10 (applied to the gating network over L4 and L16) a positive potential is applied to the trigger of the gate tube G13 (Fig. 5) over L17. This gate tube is therefore fired for the duration of the B pulse, i. e. for 1 millisecond, and MCT6 is stepped once. This happens for each operation of relay IR, which is, as usual, pulsed at 10 impulses per second, and which sends the impulses to the line, until the discharge in MCT6 reaches its final cathode. A positive potential is then applied therefrom over L18 and via C6 and W25 to the trigger of T15, which thereupon fires. As usual, this extinguishes T16 which is unable to refire (as described) until C2 has charged, and fires T5. This in the usual manner opens the gate G17 to allow it to fire on the next 1000 cycles per second pulse to step MCT10 to its eighth cathode. Since T16 has been extinguished, T18 does not fire on the 10 per second pulse succeeding that on which MCT6 reached its twelfth cathode. Therefore the first numerical digit has been sent to the line.

The second numerical digit is sent to the line when T16 refires after its trigger circuit condenser C2 has charged sufficiently. The sending is controlled from T11 and T16 as before, from the eighth cathode of MCT10 and from T4 (Fig. 3) which proves that the third digit has been received. On completion of the sending, MCT10 is stepped to its ninth position, MCT7 being left standing on its twelfth cathode.

After the inter-digital pause, the third digit is sent under the control of T11, T16, the ninth cathode of MCT10 and the eighth cathode of the input distributor MCT2 (Fig. 3), which latter proves that the fourth digit has been received.

The fourth digit is sent out under the control of T11, T16 and the tenth cathode of MCT10, and after it is sent, MCT10 steps to its eleventh cathode, from which there is no output. All the numerical storage tubes are now standing on their twelfth cathodes.

When MCT9 reaches its twelfth cathode, in addition to causing T15 to fire to end the sending, it applies a positive potential over lead L18 to the release register tube T13 (Fig. 3) which therefore fires. The quick-acting relay R in its cathode circuit operates and at *r*1 (Fig. 8) disconnects battery from the P lead, so that the register is released. Relay A therefore releases, to be followed by all the other relays so that the circuit is reset to its "pre-seizure" condition.

*Impulsing circuit (Fig. 8).*—Relay IR (Fig. 7), the impulsing relay, is a high speed relay. At its contact *ir*2 (Fig. 8), it opens and closes the impulsing loop. As has already been described its contact *ir*1 (Fig. 7) operates the slow relay ID which short circuits C2 (the inter-digital pause timing condenser) at its contacts *id*1. After ID releases, C2 must recharge before digit sending can occur. At *id*3, relay D (Fig. 8) is short-circuited.

At the end of each digit, while ID is releasing, relay D (Fig. 8) is short-circuited for long enough for D to release, which disconnects the bias voltage supply to T16. However, when ID releases, D re-operates to reconnect the bias supply. However, T16 cannot re-operate until C2 is recharged.

Figure 3:
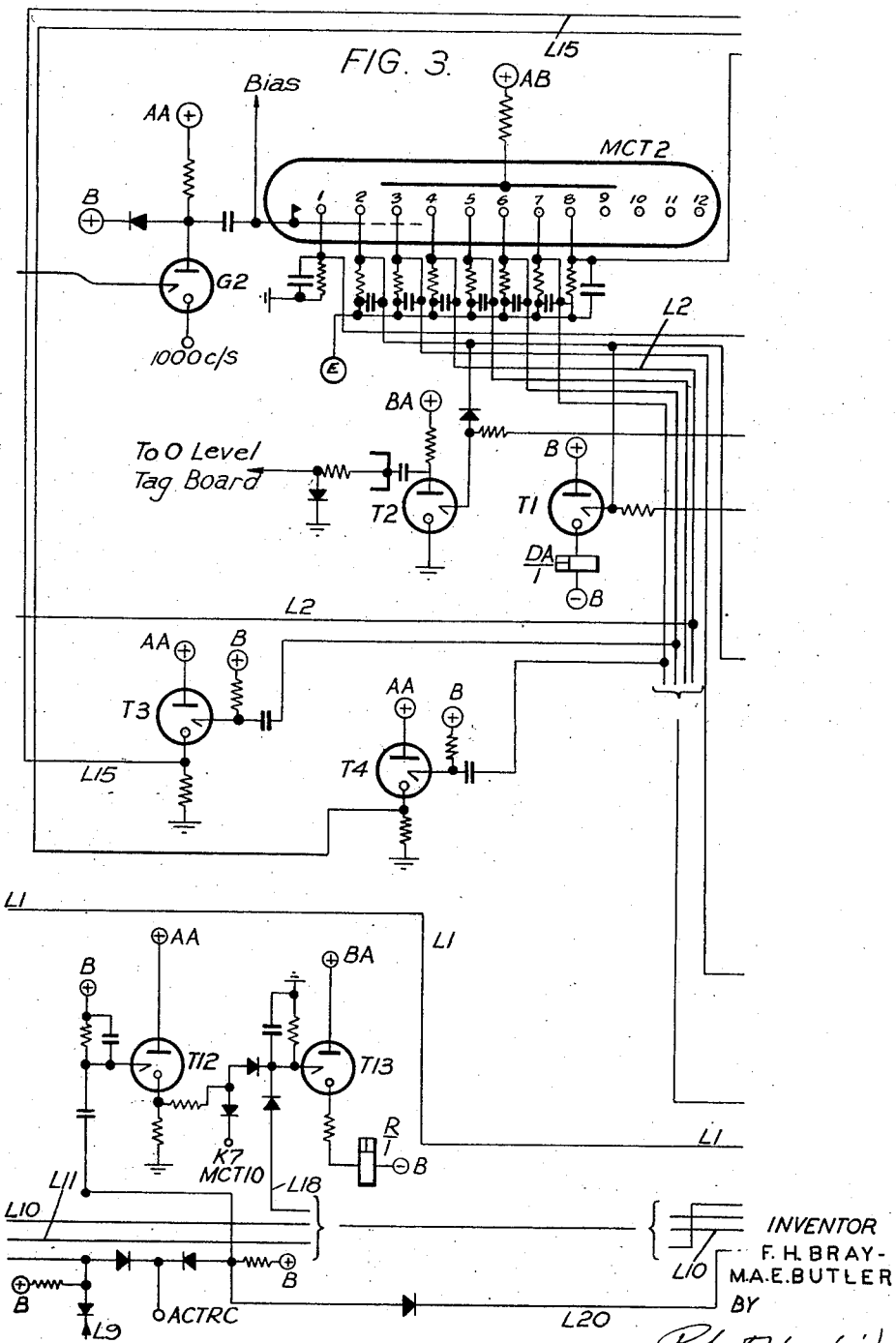

*0 level calls.*—When 0 is dialled, the first code storage tube MCT3 (Fig. 4) comes to rest on its second cathode, this being the position for the complement to 11 of the 0 digit. The input distributor steps, as usual, to its second cathode. The coincidence of these two conditions fires the 0 level tube T2 (Fig. 3). The negative output pulse from the anode of this tube is applied over strapping (not shown) to the cathodes on MCT6–9 appropriate to the 0 level translation. The 0 level translation is assumed never to exceed four digits. The negative output pulse is also applied over a connection (not shown) to the cathode of MCT10 appropriate to its use as numerical distributor. If the 0 level translation has four digits, MCT10 is fired on its seventh cathode, if it has three digits they are set up in MCT7, 8 and 9, and MCT10 is fired on its eighth cathode. If the translation has two digits they are set up on MCT8 and 9, and MCT10 is fired on its ninth cathode. The translation is then sent out in the manner described for the numerical digits of a called number.

*Dead translation.*—If there is no code for the first three digits, the register receives back the digit cut off signal. This steps MCT11 (Fig. 7) to its second cathode, and the positive output therefrom is applied over L12 to T14, which fires, since W17 is blocked from the first cathode of MCT10. This operates the forced release relay FR, which produces a forced release condition on closure of *fr*1 (Fig. 8) by means not shown.

*Digit absorbing.*—In order to avoid spurious switching by stray flicks, the digit one is never used in the first digital position. Therefore if it does occur in the first digital position it must be absorbed. This is done by firing the digit absorbing tube T1 (Fig. 3) on the coincidence of the discharge in MCT3 being on its eleventh cathode, the position corresponding to the complement to eleven of one, and of MCT2 being on its second cathode after the first digit has been received. When it fires, T1 operates relay DA in its cathode circuit, which releases relay BA (Fig. 8) at *da*1, so that dial tone is re-applied to the FR lead.

*Code only translations.*—The "code only" tube T12 (Fig. 3) is fired from the translator, as will be described, over lead L20 with the ring counter applying a positive potential to ACTRC. Leads L20 from all the registers are multipled at the cathode of tube T69 in Fig. 12. The translation digits are requested by, received by, and sent to the line by the register in the usual manner. When MCT10 is fired at its seventh cathode after the digit-cut-off signal (or the last translation digit if a six digit translation), the release register tube T13 (Fig. 3) is fired on the coincidence of this and of tube T12 having been fired from the translator. Tube T12 is only fired on "code only" calls, so that on normal calls the release register tube T13 is not fired until the last numerical digit has been sent to the line.

*The translator*

As has already been indicated, the translator is common to a number of registers. When a register is seized by a calling subscriber, a contact of its B relay (Fig. 8) starts the translator. Separate B and BA relays are provided for the translator, serving the same purpose as do the B and BA relays of the register. In normal use, when a register is seized, the translator is already working.

When the translator starts it investigates all registers to see which one is requiring its services. To do this the translator has a ring counter circuit using ordinary cold cathode tubes and multi-cathode (also cold cathode) tubes, in which there is a position individual to each register. Each cathode of a multi-cathode tube can be used as one of these positions. In the present case it is assumed that 33 registers are served by the translator. To obtain the necessary 33 positions which the ring counter scans, three twelve-cathode tubes are used, each cathode of a tube except its first, or rest cathode, being allotted to one register.

Figure 9:
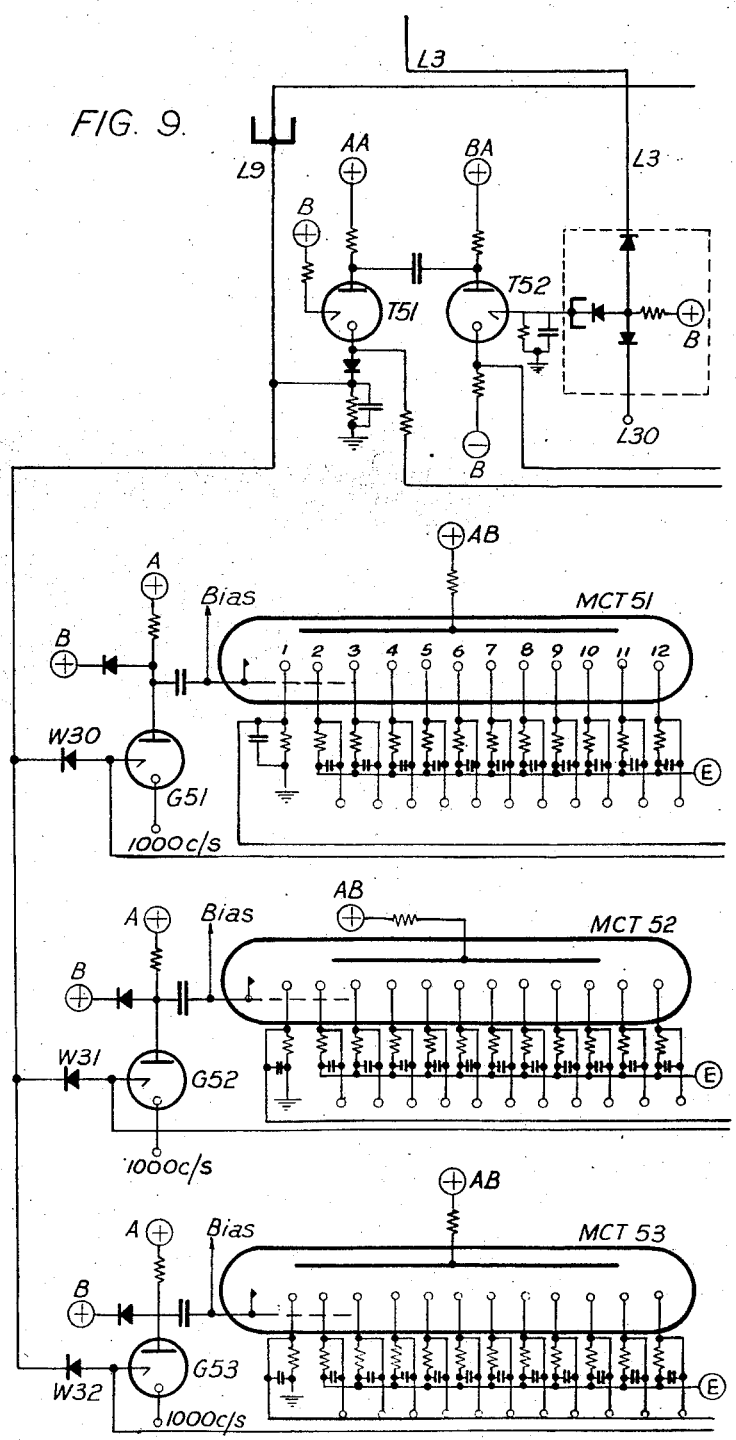
Figs. 9 to 14 is a complete circuit of a common translator according to the present invention.
Figure 10:
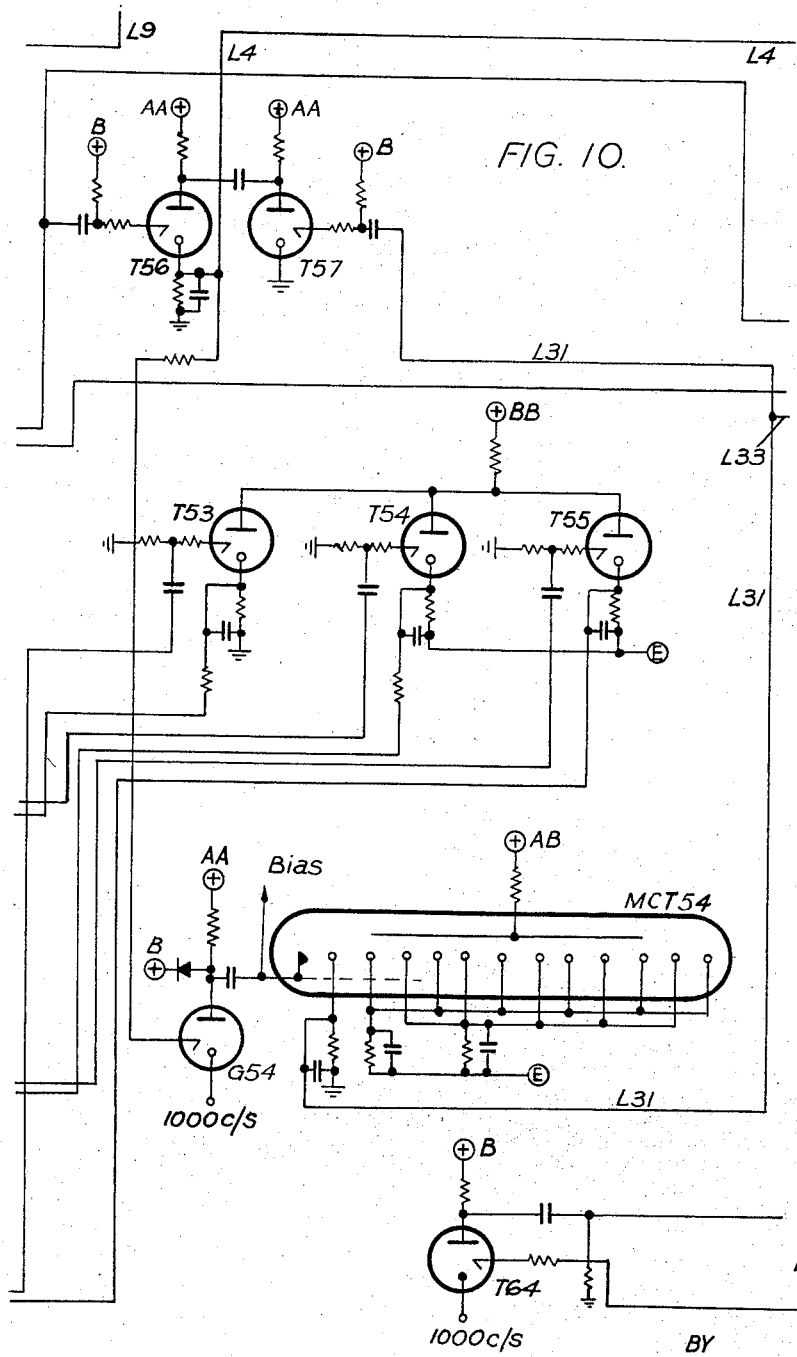

The counter comprises three multi-cathode tubes MCT51–MCT53 (Fig. 9) served by the gate tubes G51–G53 and a distributor T53–T55 (Fig. 10). The multi-cathode tubes when switched on fire initially at their first cathodes. In the normal condition with the translator not in use, the ring counter is stepping. T51 of the ring counter flip-flop T51—T52 (Fig. 9) is normally conducting and its cathode output is applied to rectifiers W30, W31 and W32 connected to the trigger electrodes of the gate tubes G51, G52 and G53.

The gate tubes G51–G53 are sequentially opened to fire on the 1000 cycles per second pulses under control of the ring counter distributor T53–T55. This steps to a new position each time one of the multi-cathode tubes reaches its home position.

When the ring counter in its stepping encounters a calling register, T52 of the ring counter flip-flop fires. The fact that a register is calling is indicated by a positive potential on the lead L3 (Figs. 2 and 9) individual to that register, and when the ring counter is standing at a position corresponding to a calling register there is a coincidence of the "calling" or request positive potential on lead L3 and a positive potential on lead L30 (Fig. 9), which extends to the ring counter cathode for that register. When this coincidence occurs, T52 fires and extinguishes T51, thereby removing its cathode output potential from W30–W32, so that the gates cannot open and the distributor is stopped.

Figure 11:
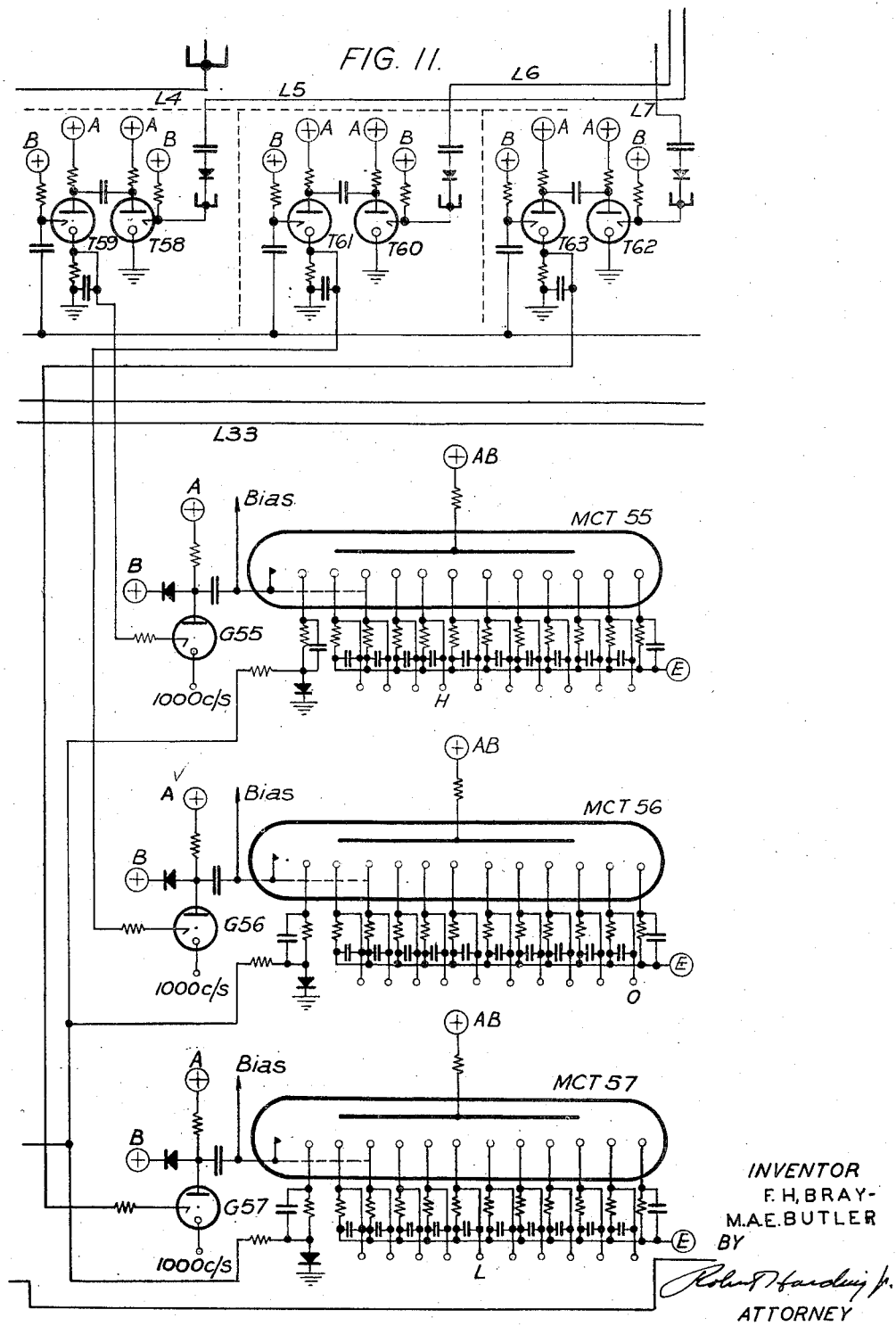
Figure 12:
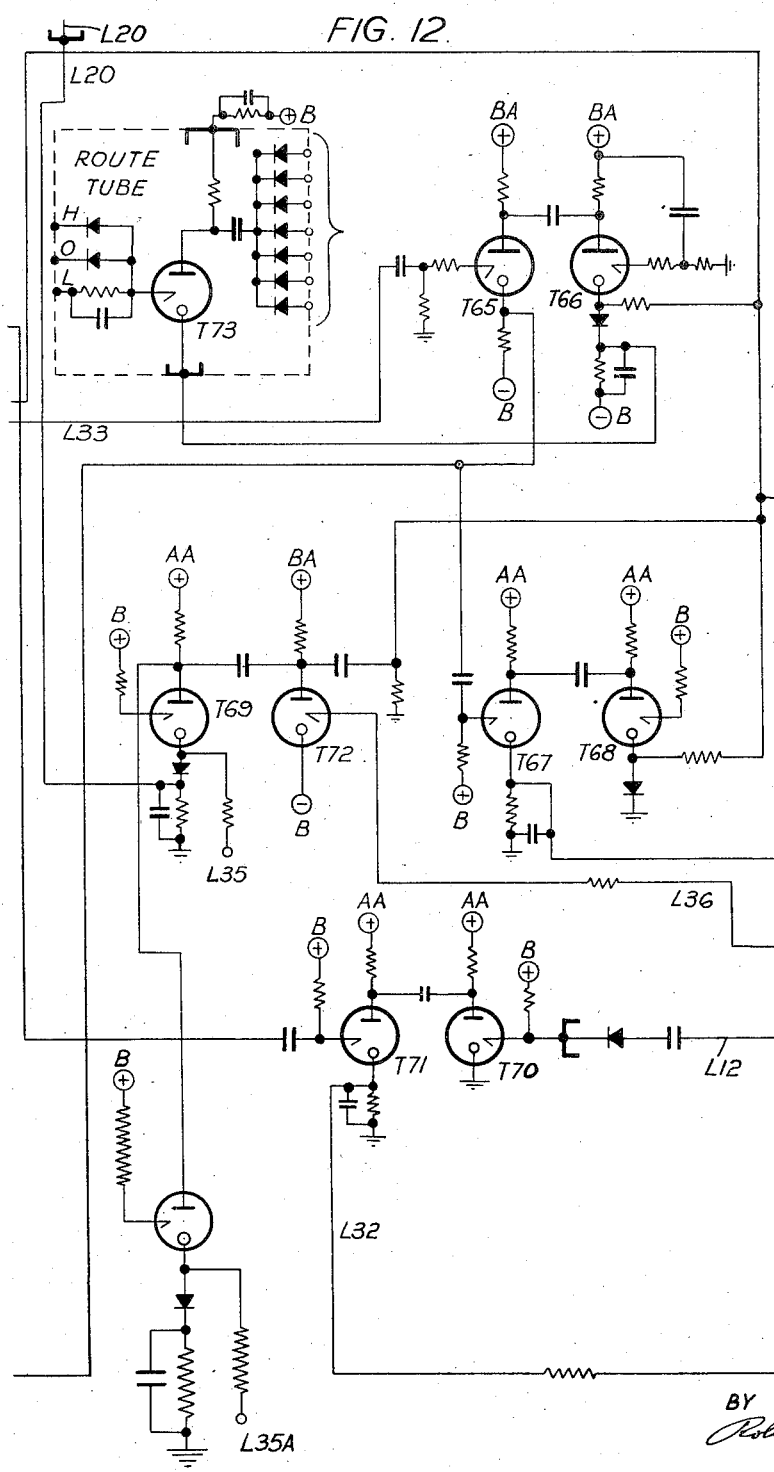

The cathode output of T52 is applied to the trigger electrodes of T56 (Fig. 10), T59, T61 and T63 (Fig. 11), and to T71 (Fig. 12). T56 fires, extinguishing T57, and applies its cathode output potential to L4. This starts the 12 millisecond pulse, which notifies the register that the translator has stopped stepping and is ready to start translation. The cathode output of T56 is also applied to the trigger electrode of gate tube G54 (Fig. 10) which therefore fires on each 1000 cycle per second pulse, so that MCT54 is stepped by each 1000 cycle per second. MCT54 continues to step until a complete cycle of 12 steps has occurred. When the home cathode refires after the twelfth step its positive-going output is applied over L31 to the grid of T57 (Fig. 10), which therefore fires and extinguishes T56, to remove the impulse from L4 and from the gate G54. Thus the 12 millisecond pulse is ended under control of MCT54.

It will be remembered that when T52 fired it applied positive also to T59, T61 and T63 (Fig. 11). Each of these tubes fires and they extinguish T58, T60 and T62 respectively. The cathode outputs of these tubes are applied to G55, G56 and G57 respectively, these being the gates controlling the code acceptor tubes MCT55, MCT56 and MCT57 respectively. These gates are thereby opened to allow the multi-cathodes tubes to step to the 1000 cycles per second pulses. It will be remembered from the description of the register that the discharges in the code storage tubes were driven through one complete cycle by the 12 millisecond pulse. These tubes were arranged to give from their twelfth cathodes output pulses whose positions in time with relation to the commencement of the 12 millisecond pulse was dependent on the digital values of the code letters. These timed impulses were applied by the storage tubes to leads L5, L6, L7 which appear in Fig. 11.

When a timed impulse occurs on one of L5, L6 and L7 that one of tubes T58, T60 and T62 connected to the lead on which the impulse occurred is fired. Assuming that the timed impulse occurs first on lead L5, as it would if the exchange letters dialled had been HOL (i. e. 405), then T58 fires and extinguishes T59. This removes the positive potential from the trigger of G55, so that the gate is closed and MCT55 stops with the discharge standing on its fifth cathode after four steps. Similarly when T62 fires MCT57 is stopped on its sixth cathode after five steps and MCT56 is stopped on its eleventh cathode after ten steps. Thus we have the digits 405 (the numerical equivalent of HOL) set up on the code acceptor tubes.

Figure 13:
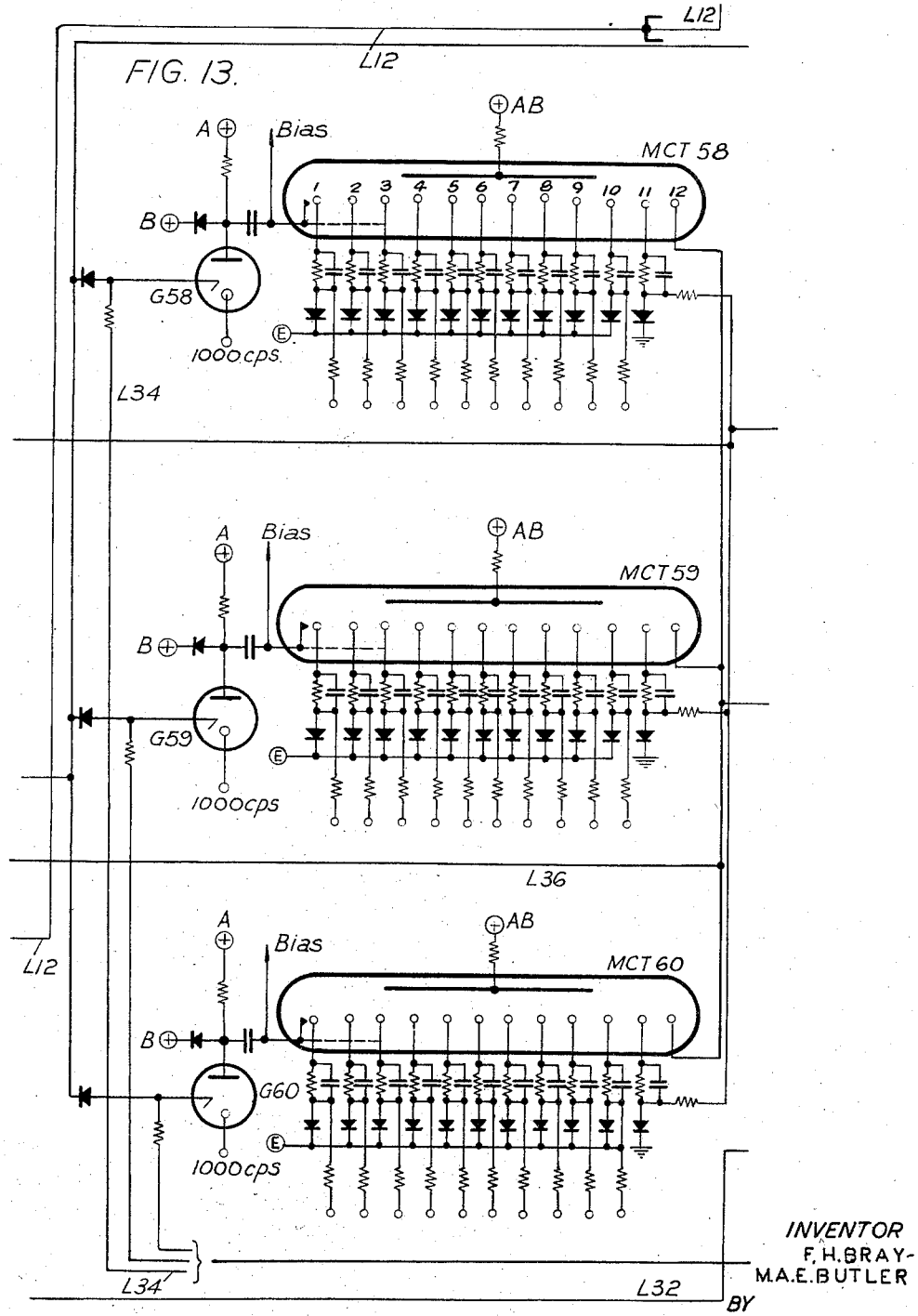
Figure 14:
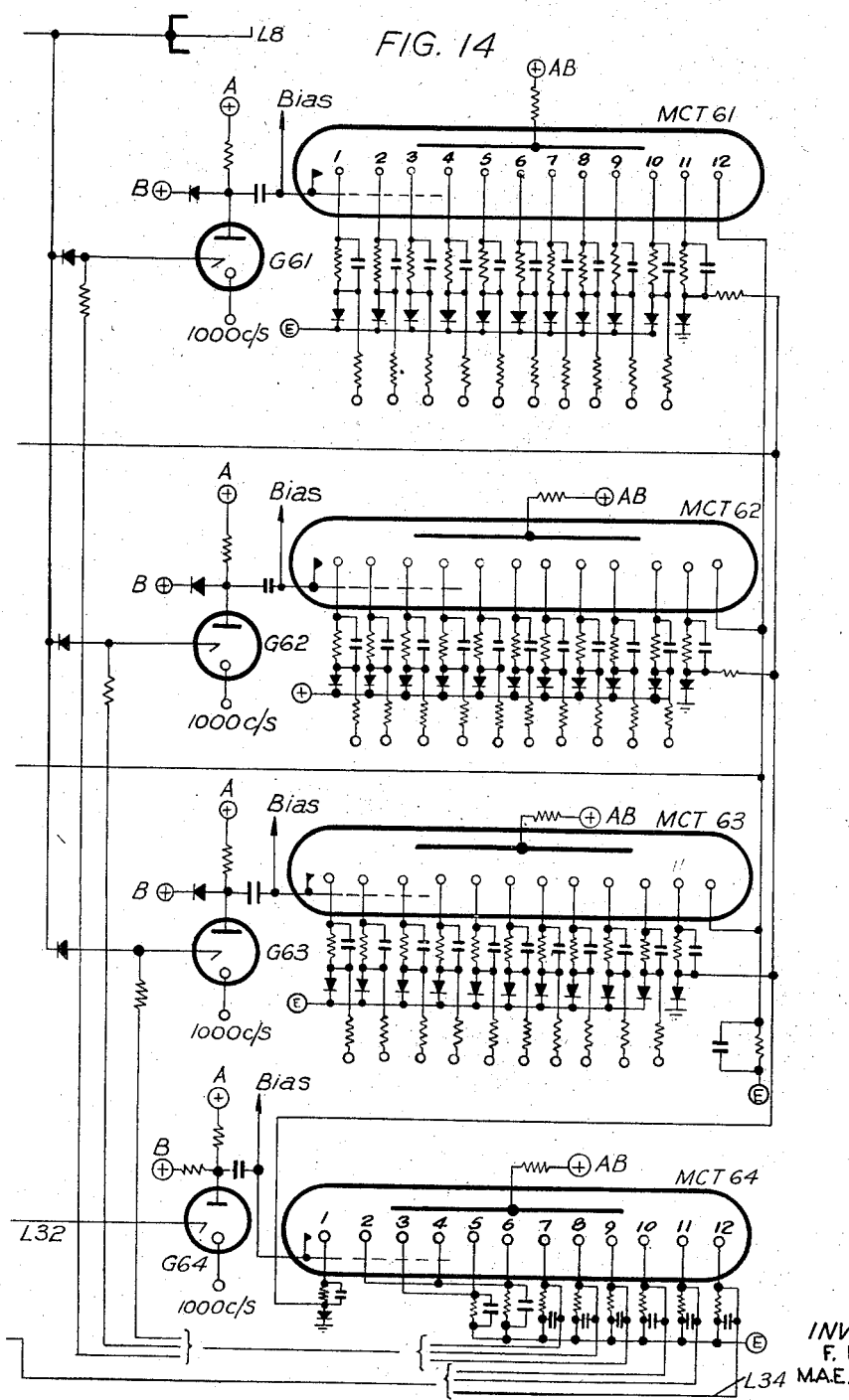

The last tube to be fired from the cathode of T52 was T71 of the translation distributor flip-flop T70—T71 (Fig. 12). Its cathode output is applied over lead L32 to the trigger electrode of gate tube G64 (Fig. 14), which fires on each 1000 cycle per second pulse to step MCT64, the translation distributor. When the translation distributor in the register reaches its last cathode a positive impulse is received therefrom over lead L12 (Fig. 13). This positive impulse fires T70, which extinguishes T71. This closes the gate G64 so that MCT64 is stopped. Thus we have stopped the translation distributor after eleven steps, assuming that the register is asking for the first digit of the translation, so that MCT64 now stands on its twelfth cathode. Thus the translator now has set up in the code acceptors the called exchange digits and an indication which translation digit, in the present case the first, is required.

The cathodes of the code acceptor tubes MCT55–57 are multipled to a number of route tubes. For every exchange in the system there is one route tube, one, that for HOL, being shown as T73, Fig. 12. Positive potentials are connected to its trigger electrodes over the three leads marked HOL, these leads extending from appropriate cathodes of the code aceptor tubes, also marked HOL.

When the 12 millisecond pulse ended, and T57 was fired over L31, the positive potential from the rest cathode of the 12 millisecond tube MCT54 is also applied over leads L31 and L33 to the trigger of T65 of the set route flip-flop (Fig. 12). The result of this is to fire T65 and extinguish T66. When T66 is extinguished, its cathode potential falls as the condenser in its time constant circuit discharges through the time constant resistance. It will be seen that T66 and all the route tubes such as T73 share the same cathode RC time constant circuit, so that when the voltage across this circuit falls, that route tube whose trigger has been primed over all three leads fires.

The negative-going output from the anode of T73 is applied over a condenser to a number of rectifiers, there being one more than the possible number of digits in the translation. One of the translation storage tubes is fired from each rectifier output of T73, except one. It has been assumed that the translation for HOL is the four digit code 8792. The connections from the anodes of the route tubes are applied to the appropriate cathodes of the translation storage tubes MCT58–63. The connections are so made that the translation storage tubes are set in such a manner that the translations are sent to the register as the complement to 12 of the translation digits. To do this the actual digital values of the digits are set in the storage tubes. As many tubes are fired as there are digits in the translation.

The reason for the digits being set up on the translation storage tubes in the manner mentioned is described in connection with the register. It will be remembered that this is necessary because the translation tube MCT11 in the register normally rests on its twelfth cathode. This may be achieved by suitably strapping from the route tube anode. In this case T73 only has five anode outputs although it has been shown with seven. The storage tubes normally rest on their eleventh cathodes. Assuming the translation to be 8792, MCT58 is fired on its eighth cathode, MCT59 on its seventh cathode, MCT60 on its ninth cathode, MCT61 on its second cathode and MCT62 and 63 are left discharging at their eleventh cathodes.

When tube T65 in the set route flip-flop fired, its cathode output also triggered T67 of the translation flip-flop T67—T68. The cathode output of this tube T67 combines with the output from that cathode of the distributor MCT64 (Fig. 14) which applies to the digit in question to open one of the gates G58–G63. In the present case as the first translation digit is being requested, MCT64 will be discharging on its twelfth cathode, and the positive output potential therefrom will be applied over lead L34 to the trigger of G58. This with the cathode output potential from T67 allows G58 to fire on the 1000 cycles per second pulses. Therefore MCT58 is stepped by the 1000 cycles per second pulses. MCT58 is fired at its eighth cathode, so that after four steps the discharge reaches its twelfth cathode.

It will be remembered that the anode of the route tube T73 has one output in excess of the number needed to set up the translation storage tubes. In the case of "code-only" calls, this seventh output is taken to L35, and fires T69 (Fig. 12), which is the "code only" cut-off tube in the translator. In all other cases this seventh output is taken to L35A to fire T69A (Fig. 12), the normal cut-off tube in the translator. In all cases T72 is extinguished by T69 or T69A, and in the case when T69 is fired (code only), its positive-going cathode output is applied over L20 to the register to fire tube T12 (Fig. 3), as already described. This happens at the same time that the translation tubes are being set. When the selected storage tube, MCT58 in the present case, reaches its twelfth cathode, the positive-going output thereof is applied over lead L36 to the trigger of T72, which fires and extinguishes T69 or T69A as the case may be. This removes the positive potential from L20 in the former case and also terminates the pulse representing the translation digit.

When T72 fires, the negative-going pulse from its anode fires T66 and T68 to reset these two flip-flops. It also fires the tube T51 in the ring counter flip-flop to restart the ring counter and fire the release tube in the register. It also resets the storage tubes MCT58–63 to their eleventh positions. To prepare the translator for the next call it is necessary to reset all the tubes which are not in their normal condition. To do this, tube T64 (Fig. 10) fires on the next 1000 cycle per second pulse after T65 (Fig. 12) fired and gates the pulses to reset the code acceptor tubes. It continues to apply these pulses to the home cathodes of the code acceptors MCT55–57 until the set route tube T65 fires on the next call, but this is without effect. All tubes in the translator are now reset to normal and the translator is ready for the next call. The translation storage tubes are reset to their rest positions with the discharges on the eleventh cathodes by the negative going anode output of T72.

Succeeding digits of the translation are dealt with on succeeding cycles of the ring counter. On a later cycle of the ring counter, the translator finds the same register calling for the second translation digit. The translator therefore seizes the register as before, and in the same manner receives therefrom the complete called exchange designation. As before also the translation distributors in register and translator step together under control of the one in the register. However, as the distributor in the register starts from its second cathode it makes one step less than in the previous case before it sends the signal over L12 to stop the translator's translation distributor. The latter always starts from its first cathode and so stops in this case on its eleventh cathode, whereas before it stopped on its twelfth cathode. The distributor therefore prepares the translator to send the second translation digit to the register.

Operation continues in this manner until the entire translation has been sent, when a digit cut-off is necessary if the translation consists of less than six digits.

*Digit cut off.*—As explained in the description of the register, the digit cut off condition is a unit digit translation. This is sent from the earliest code translation storage tube in the translator which has not been set up from the route tube. In the example referred to already, which was a fourt digit translation, the earliest such tube is the fifth tube, i. e. MCT62. This tube will have its discharge standing on the eleventh cathode, and so when the translation distributor is stopped in the position corresponding to this tube it only takes one step to reach its twelfth cathode to give the unit digit output. In the case of a six digit translation, of course, the register knows that this is the complete translation and does not call the translator again.

*Dead code.*—If there is no route tube for a code dialled, i. e. if it is a dead code, no translation occurs, so that the first code storage tube MCT58 will still be on its eleventh cathode when it is prepared to send its contents to the line. Therefore the unit-digit-cut-off condition is sent to the line. As has been described, the register recognises this and applies a forced release condition.

*Code only.*—The route tube fires a "code only" tube T69 (Fig. 12) which over L20 fires the "code only" tube in the register with the results already described.

While the principles of the invention have been described above in connection with specific embodiments, and particular modifications thereof, it is to be clearly understood that this description is made only by way of example and not as a limitation on the scope of the invention.

What we claim is:

1. Automatic telecommunication exchange system which comprises a plurality of registers and a common translator, electronic means in each register responsive to reception thereby of the called exchange designation digits to produce a characteristic signal indicating that translation is required, means for transmitting said signal to said translator, electronic scanning means in the translator for scanning said registers in search of said signal indicating a register requiring a translation, an electronic device in said translator controlled by said scanning means and responsive to detection of said signal for stopping said scanning means, an electronic circuit in the register for indicating which digit of the translation is required, means in the register for sending the called exchange designation digits and the digit required indication to the translator, electronic means in the translator responsive to reception of the called exchange designation digits and the indication as to which translation digit the register requires to send to that register the required translation digit, means in the register to send said digit of the translation to selection equipment at a subsequent stage, and means responsive to completion of the operation of said sending means to transmit a signal to request the services of the translator for a subsequent translation digit.

2. Automatic telecommunication exchange system having a plurality of registers and a translator common to said registers and which comprises means for receiving digits of a dialed number, electronic storage means in each said register for storing each digit of said dialled number, an electronic distributor operated by said receiving means and adapted to control the storage of received digits in said storage means, a connection leading from said register to said translator, a request circuit in each said register operated by said receiving means and adapted on reception thereby of the dialed exchange designation digits to apply a characteristic signal to said connection extending to said translator, a ring counter in said common translator having a position individual to each said register terminating in said connection and adapted to scan said positions in search of a register requiring a translation, means connected to said ring counter and adapted when said ring counter reaches a position with a register signal thereon to stop said ring counter, a plurality of additional connections between said translator and the seized register, means connected to said stopping means to signal to said register over one of said additional connections that the translator is ready for use, means in each register responsive to said signal from the translator to send to said translator over other of said additional connections both the called party's exchange designation digits and an indication as to which digit of the translation is required, means for receiving said indication, electronic digit storage means in the translator connected to said other additional connections and adapted to store said digits received from the register, an electronic distributor in said translator connected to said indication receiving means and adapted to be set in accordance with the indication as to which digit of the translation the register requires, a route tube in the translator individual to every exchange to which the exchange designation digits can apply, means for operating one of said route tubes when digits representative of the exchange with which said tube is associated are stored in the translator digit storage means, digit transmission means connected to and responsive to the operation of said route tube and to the condition of said electronic distributor in said translator for sending the required translation digit to the register over another of said additional connections, means controlled by said last mentioned means and responsive to completion of said transmission to dis-associate said register and said translator and to re-start said ring counter, means in each register for receiving the digit signals, means operated by said signal receiving means for transmitting said digit to a circuit at a subsequent stage, means in the register operated by said digit transmitting means for causing said request circuit to re-operate to request said translator for the next translation digit, means operated by the translated digit transmitting means to notify the register that transmission of the translation is complete, and means in each register operated by said signal receiving means to transmit the numerical digits of the called number.

3. Automatic telecommunication exchange system comprising a plurality of registers and a common translator, wires connecting each of said registers with said common translator, means in each register for marking the associated wire when said register requires the services of a translator, electronic means for scanning said wires, electronic means responsive to the marking on a wire for stopping said scanning means and for transmitting a signal to said register, means in said register for receiving called-exchange-designation digits, said marking means being controlled by said digit receiving means and being adapted to operate in response to reception by said digit receiving means of the called-exchange-designation digits, means in the register for transmitting signals to the translator to request the translation digits from the translator singly, means in the translator responsive to said request signals for creating translator digits, means in the translator for sending the translation digits so created separately to the register, and means responsive to signals from said digit requesting means for operating said translation-digit sending means.

4. Automatic telecommunication exchange systems, as claimed in claim 3, further comprising means in said translator for sending to the register an end of translation signal, and means connected to the translation digit sending means for operating said sending means after the last translation digit is sent.

5. Automatic telecommunication exchange system, as claimed in claim 4, further comprising storage devices in said register for storing both the exchange designation and the numerical digits of a called number, means controlled by said register storing devices for transmitting signals to said translator, storage devices in said translator for storing the exchange designation only of a called number, and means for operating said translator storage devices in response to the signals received from said register storing devices.

6. System, as claimed in claim 5, in which the called digit storing means is arranged to store the called number digits in the form of their complements, further comprising means for sending the complements of the called exchange designation digits to the translator after interconnection therewith.

7. System, as claimed in claim 3, in which each register has a translation storage device, means for storing each translation digit received from the translator in said device, and means controlled by said translation storage device for controlling the transmission of said translation digits to succeeding equipment.

8. System, as claimed in claim 7, and in which each register further comprises means responsive to reception by said translation storage device of a translation digit for transmitting said digit to a succeeding selection device, means for signaling the translator, and means responsive to completion of transmission of said digit for operating said signaling means to request the services of the translator for the next digit of the translation.

9. System, as claimed in claim 8, further comprising means in the register responsive to reception from the translator of the last digit of a "code only" call, and means controlled by said responsive means for causing said register to release immediately after the entire translation of the "code only" call has been transmitted to succeeding equipment.

10. Automatic telecommunication exchange system comprising a plurality of registers and a common translator, wires connecting each of said registers with said common translator, means in each register for marking the associated wire when said register requires the services of a translator, electronic means for scanning said wires, electronic means responsive to the marking on a wire for stopping said scanning means and for transmitting a signal to said register, storage devices in each register for storing the exchange designation of a called number and additional storage devices for storing the numerical designation of a called number, and means in each register connected to said exchange-designation-storage devices and responsive to reception thereby of a 0 level call for altering the operation of said additional storage devices to effect translation thereof in the register without employing the translator.

11. A common translator for use in an automatic telecommunication exchange system employing a plurality of registers which comprises a plurality of wires leading from said translator respectively to said registers, register scanning means for scanning said wires to search for a register requiring a translation, means responsive to a predetermined condition of a wire leading to a register and indicating that said register requires a translator for stopping said scanning means and for interconnecting that register and said translator, means operated by the stopping of the scanning means for sending a "translator ready" signal to the register which required a translation, means in said translator for receiving and storing the called exchange designation digits from said register, means for receiving a signal from said register, a translation distributor controlled by said signal receiving means and adapted to assume a condition characteristic of the translation digit required under control of said further signal from the register, and means controlled by said digit storing means for sending to the register that digit of the translator which the register requires.

12. A common translator, as claimed in claim 11, a further comprising means controlled by the transmission of the last digit of a translation for sending to the register a signal indicating that the translation is complete.

13. A common translator as claimed in claim 12, in which the scanning means comprises a ring counter for effecting said scanning, said ring counter having a position for each register served by the translator.

14. A common translator, as claimed in claim 13 which comprises an electronic device individual to each exchange whose designation digits may require to be translated, means for operating said device in response to reception of a predetermined combination of the designation digits, electronic translation storage devices in which said translations may be set up, and means responsive to the operation of one of said devices to set up the digits of the translation in said translation storage means.

References Cited in the file of this patent

UNITED STATES PATENTS

| | | |
|---|---|---|
| 2,241,031 | Holden et al. | May 6, 1941 |
| 2,298,699 | Hubbard | Oct. 13, 1942 |
| 2,299,514 | Taylor | Oct. 20, 1942 |
| 2,502,415 | Bray et al. | Apr. 4, 1950 |
| 2,567,115 | McCreary | Sept. 4, 1951 |
| 2,570,971 | Myers | Oct. 9, 1951 |
| 2,603,716 | Low | July 15, 1952 |
| 2,714,179 | Thomas et al. | July 26, 1955 |